Feb. 13, 1940. B. F. KABOSKEY ET AL 2,190,531
RETRIEVING DEVICE
Filed Aug. 21, 1939

Benjamin F. Kaboskey
Chester Walczak  INVENTORS
BY Victor J. Evans & Co.
ATTORNEYS Patented Feb. 13, 1940

2,190,531

UNITED STATES PATENT OFFICE 2,190,531

RETRIEVING DEVICE

Benjamin F. Kaboskey and Chester J. Walczak, Milwaukee, Wis.

Application August 21, 1939, Serial No. 291,246

2 Claims. (Cl. 43—25)

This invention relates to retrieving devices for fishing rods or the like which are accidentally submerged in deep water.

One of the objects of this invention is to provide an indicating float on the surface of the water above the rod or the like to indicate the location of the submerged rod.

Another object of the invention is to provide an automatic releasing means for the indicator which may be acted on by the water to permit the float to rise to the surface of the water.

A further object of the invention is to provide a protecting means to prevent releasing the automatic means by rain or spray from waves while the rod and the device are in use.

A still further object of the invention is to provide an attachment on a fishing rod so located as not to interfere with the operation of the rod or reel while in use.

Other objects and advantages of the device will appear when read with the following specification.

Figure 1:
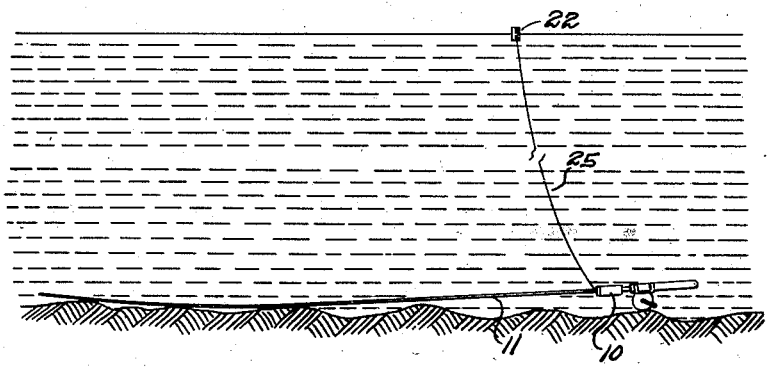
Figure 1 is a side elevation of a retrieving device constructed in accordance with the invention and showing the indicating float in indicating position.
Figure 2:
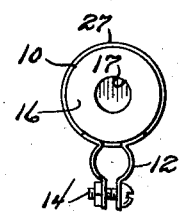
Figure 2 is an end elevation of the retrieving device.
Figure 3:
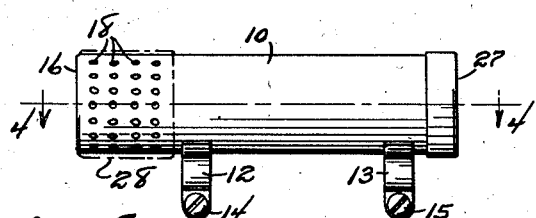
Figure 3 is a side elevation of the retrieving device.
Figure 4:
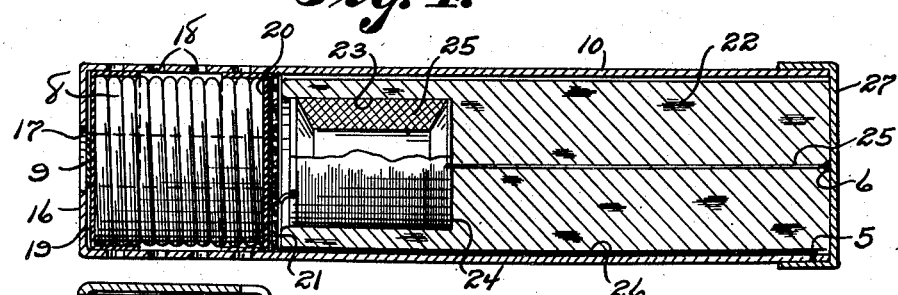
Figure 4 is a longitudinal section taken on line 4—4 of Figure 3 showing the mechanism for expelling the float, with the protective sleeve removed.
Figure 5:
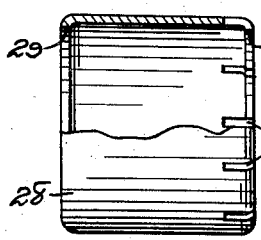
Figure 5 is a fragmentary longitudinal section of the protective sleeve.

Referring to the drawing, 10 indicates a cylindrical tube. The tube is attached to a fishing rod 11 by adjustable split ring clamps 12 and 13. Arcuate portions of the clamps embrace the rod and are tightened on the rod by bolt and nut fasteners 14 and 15 which urge the extremities of the clamps toward one another.

One end of the tube is closed by an end wall 16 having an opening 17 through which water may enter the tube. In the cylindrical wall of the tube, near the end wall 16, perforations 18 are formed to admit water to the interior of the tube.

A helical spring 8, tensioned to expand, is disposed in the tube in compressed condition, and sheet material caps 19 and 20 receive the ends of the spring.

A soluble band 9 is passed around the ends of the spring and the caps 19 and 20 to hold the unit compressed. The unit is disposed in the tube 10 adjacent the perforations and abutting the end wall 16.

A disc 21 of stiff sheet material is located in the tube adjacent the free end of the spring 8.

An indicating cork float 22 is provided with a longitudinal bore 23 to receive a spool 24 of thread 25. The float is positioned in the tube to abut the bored end with the disc 21, and is releasably confined in the tube by a cap 27 disposed on the open end of the tube. One end of the thread is trained through and secured to the end of the float remote from the bore, preferably by tying a knot 6 on the end of the thread which projects from the end wall of the float. The other end of the thread is secured to a wire 26 which extends longitudinally of the tube to nearly the end of the float and is secured to the tube through the medium of solder 5 or other suitable means.

In order to protect the device from accidental operation while in use until the device is submerged, a sleeve 28 is provided. Flanges 29 and 30 are disposed on opposite ends of the sleeve and are engaged with the outer wall of the tube to space the cylindrical wall of the sleeve at the perforated portion of the tube.

The wall of the sleeve adjacent the flange 30 is provided with a plurality of slots 31 which extends radially through the flange and open through the inner peripheral end of the flange.

In operation, if the rod should be accidently dropped overboard into deep water, the water will enter the tube through the opening 17 and will pass through the longitudinal slots 31 of the sleeve and pass between the inner face of the sleeve and the outer cylindrical wall of the tube and through the perforations 18 to dissolve the band 9. The spring 8 is then free to expand against the cap 20 to expel the disc 21, the float 22, the spool 24 of thread 25, and the loosely fitted cap 27 from the tube 10, as a unit.

The float is then free to rise to the surface of the water to indicating position and to pay out thread which is secured to the free end of the wire 26. The free end of the wire 26 follows the spool and float out of the tube and extends from the tube to hold the secured end of thread the length of the wire away from the open end of the tube, to permit unobstructed operation of the float paying out the thread.

The float is disposed in indicating position above the rod to permit the fisherman to easily pull on the thread to retrieve the submerged rod.

From the above description it is thought the construction and operation of the invention will be fully understood without further explanation.

We claim:

1. A fishing rod retrieving device comprising a cylindrical tube perforated near one end, an end wall in the tube at the perforated end having an opening therein, means on the tube for attaching the tube to a fishing rod, a helical spring in the tube adjacent the perforations and abutting said end wall, an endless soluble band passed around the spring to hold the spring compressed and permit the spring to expand upon being dissolved by action of water on the band, an indicating float in the tube adapted to be expelled from the tube upon expansion of the spring, and a spool of thread carried by the float, the ends of the thread being connected respectively to the float and to the tube.

2. A fishing rod retrieving device comprising a perforated tube, an expansion spring located in the tube adjacent the perforations thereof, a soluble means holding the spring compressed, a float in the tube having a longitudinal bore, a spool of thread within the bore having one end of the thread connected to the float and the other to the tube, a sleeve on the perforated end of the tube overlying the perforations and spaced from the perforated portion of the tube to protect the soluble means from accidental operation until submerged, said sleeve having openings therein to permit water to pass between sleeve and tube into the tube to dissolve the soluble means for releasing the spring to expel the float from the receptacle, said float paying out the thread from the spool as it rises to the surface.

BENJAMIN F. KABOSKEY.
CHESTER J. WALCZAK.